United States Patent

Sami

[11] 4,010,724
[45] Mar. 8, 1977

[54] APPARATUS FOR HEATING AN INTAKE MANIFOLD IN AN INTERNAL COMBUSTION ENGINE

[75] Inventor: Hiroshi Sami, Toyota, Japan

[73] Assignee: Toyota Jidosha Kogyo Kabushiki Kaisha, Toyota, Japan

[22] Filed: Oct. 3, 1974

[21] Appl. No.: 511,522

[30] Foreign Application Priority Data

July 17, 1974 Japan .................... 49-81840

[52] U.S. Cl. ................ 123/122 AC; 123/122 AB; 123/122 H
[51] Int. Cl.² ........................................ F02M 31/00
[58] Field of Search ............. 123/122 AC, 122 AB, 123/122 H; 60/901

[56] References Cited
UNITED STATES PATENTS

| | | | |
|---|---|---|---|
| 1,889,270 | 11/1932 | Thomas | 123/122 H |
| 2,196,330 | 4/1940 | Chandler | 123/122 H |
| 2,437,724 | 3/1948 | Brown | 123/122 H |
| 3,148,669 | 9/1964 | Platner | 123/122 AB |
| 3,717,130 | 2/1973 | Thornburgh | 123/122 AB |
| 3,809,019 | 5/1974 | Stoltman | 60/901 |
| 3,831,568 | 8/1974 | Heimburg | 123/122 H |
| 3,968,648 | 7/1976 | Futamura | 123/122 AC |

Primary Examiner—Ronald H. Lazarus
Attorney, Agent, or Firm—Stevens, Davis, Miller & Mosher

[57] ABSTRACT

Apparatus for heating an intake manifold in an internal combustion engine comprising a heating chamber for heating an intake manifold, arranged below a riser portion of the latter and communicated with the inside of an exhaust reactor; a by-pass for the exhaust gas provided in the reactor, the upstream end thereof opening into said heating chamber and the downstream end opening into a passage connecting the inside of the reactor to an exhaust pipe; and control valve means provided in said passage adjacent to the downstream end of the by-pass to alternatively divert the flow route of the exhaust gas.

7 Claims, 5 Drawing Figures

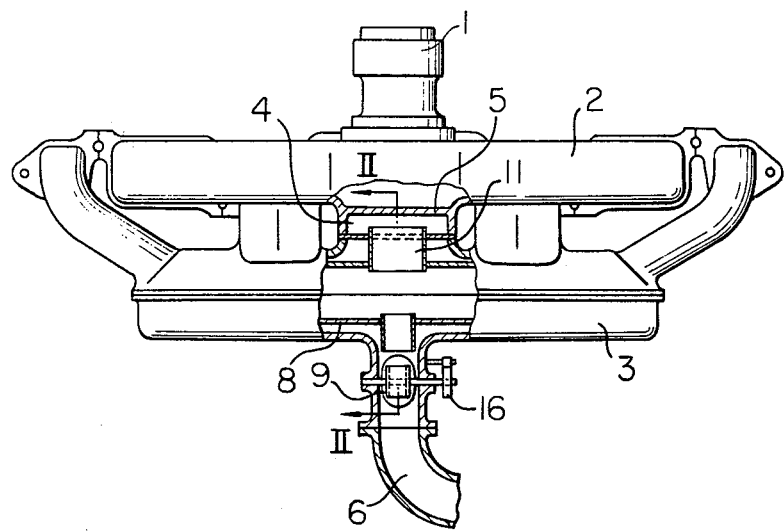
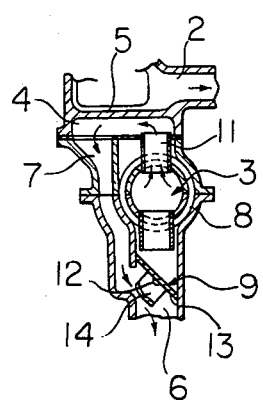
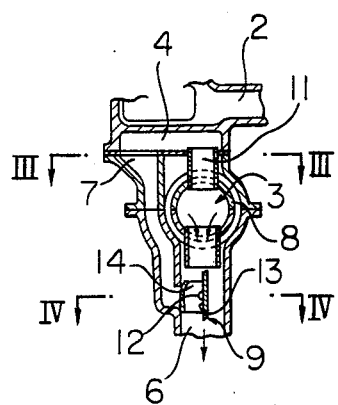

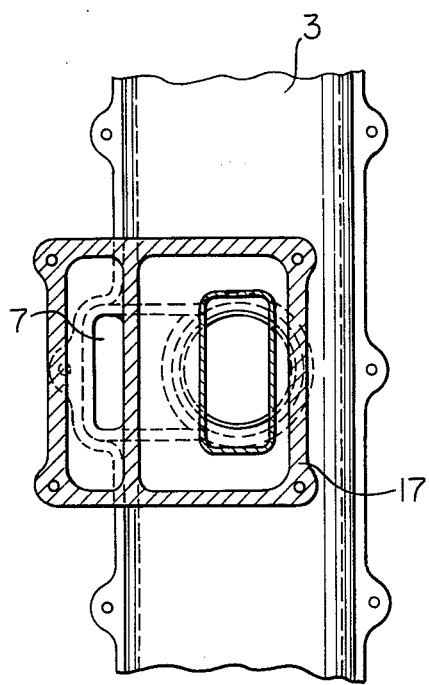
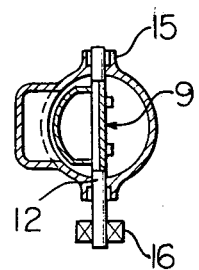

APPARATUS FOR HEATING AN INTAKE MANIFOLD IN AN INTERNAL COMBUSTION ENGINE

This invention relates to an apparatus for heating an intake manifold in an internal combustion engine.

In an internal combustion engine, in order to exclude noxious components, such as HC and CO from the exhaust gas or to diminish the amount thereof from the exhaust gas, one of the most effective methods is to heat the intake manifold. Generally, during engine-starting, the amount of noxious components, such as CO and HC, contained in the exhaust gas before the engine warms up, exceeds that contained in the exhaust gas after the engine warms up. This is because the temperature in the intake manifold, particularly in the riser portion thereof, is not sufficiently high to completely gasify a fuel and, accordingly, the optimum mixture cannot be obtained. To eliminate the above disadvantage, methods or apparatus have been adopted in which noxious components contained in the exhaust can be decreased by re-circulating the cooling water, or the exhaust gas, along the riser portion of the intake manifold to heat the intake manifold. These methods heretofore in use or devices according to these methods have, however, serious disadvantages, such as large and complex construction, increase in number of parts or elements or an increase in the cost of manufacturing, since they essentially require a re-circulating passage or by-pass.

One of the objects of the present invention is to provide an apparatus for heating an intake manifold in which the above-mentioned disadvantages may be decreased and a compact structure may be obtained, while keeping the high quality in cleaning efficiency of the exhaust gas, particularly in the so-called "counter flow engine" in which the intake system and the exhaust system are arranged on the same side with respect to the engine.

In accordance with the present invention there is provided a heating apparatus for an intake manifold in an internal combustion engine comprising a heating chamber for heating an intake manifold, arranged below a riser portion of the latter and communicated with the inside of an exhaust reactor; a bypass for the exhaust gas provided in the reactor, the upstream end thereof opening into said heating chamber and the downstream end opening into a passage connecting the inside of the reactor to an exhaust pipe, and; control valve means provided in said passage adjacent to the downstream end of the by-pass to alternatively divert the flow route of the exhaust gas, said control valve being capable of movement in the passage between a first position in which the downstream end of the by-pass is closed by the valve means to allow the exhaust gas from the reactor to be only directly discharged into the exhaust pipe, and a second position in which the passage directly discharging the exhaust gas from the reactor into the exhaust pipe is closed to establish a route for the discharged exhaust gas into the exhaust pipe through said heating chamber and by-pass.

The objects and advantages of the invention will be discussed in more detail with reference to particular preferred embodiments illustrated by the accompanying drawings wherein:

FIG. 1 shows a partial sectional side view of the apparatus for heating an intake manifold according to the present invention;

FIGS. 2A and 2B show sectional views taken along the line II—II of FIG. 1, in positions before and after the engine warms up, respectively, FIG. 3 shows an enlarged sectional view taken along the line III—III of FIG. 2B, and;

FIG. 4 shows an enlarged sectional view taken along the line IV—IV of FIG. 2B.

FIG. 1 shows a part of an internal combustion engine according to the present invention, such as in an automobile. Below an intake manifold 2 connected to a carburetor 1, there is provided a reactor 3 in which exhaust gas is, as in typical internal combustion engines, re-burnt and cleaned prior to being discharged outside through exhaust pipe 6. A heating chamber 4 is provided below a riser 5 and above the reactor 3 to heat the intake manifold 2, particularly the riser portion thereof. The heating chamber 4 is connected to an inner core 8 in the reactor 3 through a passage 11. According to the present invention, there is provided in the reactor 3 a by-pass 7 (see FIGS. 2A and 2B), the upstream end of which opens into said heating chamber 4 with the downstream end opening into said exhaust pipe 6. Again according to this invention, in a passage which directly connects said reactor 3 to the exhaust pipe 6, adjacent to the downstream end of the by-pass 7 opening into said passage, there is provided a control valve means 9 which, as necessary, either allows communication between the bypass 7 and the exhaust pipe 6 or prevents such communication. As shown in FIGS. 2A and 2B, the heating chamber 4 is preferably arranged adjacent to and above the reactor 3 and the by-pass 7 is arranged as near as possible to the side wall of an inner passage of the reactor 3. Thus, a length of the bypass, that is, the entire length of the recirculating passage for the exhaust gas, can be considerably shortened and the space necessary for provision of the by-pass can be reduced, resulting in a more compact and simple construction of the reactor. The flow of the exhaust gas is shown with an arrow in FIGS. 2A and 2B.

The control valve 9 closes the downstream end of the by-pass 7, to prevent the exhaust gas from being discharged into the exhaust pipe through the by-pass, when the exhaust gas is directly discharged into the exhaust pipe 6 from the reactor 3. Further, when the control valve 9 opens the downstream end of the by-pass 7, and closes the flow passage directly connecting the reactor 3 to the exhaust pipe 6, the exhaust gas is discharged from the reactor 3 through the by-pass 7, as will be explained in detail later.

To perform the above-mentioned action, the control valve 9 may be of any proper construction although only one embodiment is shown in the drawings.

Referring to FIGS. 2A, 2B and 4, the hat-shaped like control valve 9 comprises a base portion 13 and a head portion 14 and pivots around a shaft 12. That is, the valve 9 is capable of moving from a first position (FIG. 2B) in which the head portion 14 closes the downstream end of the by-pass 7 and thereby, the exhaust gas flows directly from the reactor 3 into the exhaust pipe 6, to a second position (FIG. 2A) in which the base portion 13 closes the passage directly connecting the reactor 3 to the exhaust pipe 6 and, thereby, the exhaust gas flows from the reactor 3 into the exhaust pipe 6 through the heating chamber 4 and the by-pass 7. The shapes and sizes of the two portions 13 and 14 of valve 9 are, of course, determined by the shapes and inner diameters or sizes of the downstream passages of both the reactor 3 and the by-pass 7 with which said two portions are to be engaged, respectively. Preferably, the downstream passages of the reactor 3 and the by-pass 7 have circular-shaped cross-sections, respectively and therefore, the base portion is substantially a disc shape and the head portion also has a substantially circular section. The shaft 12 extends perpendicular to the surface of the drawings in both FIGS. 2A and 2B. The control valve 9 can be operated by, for example, bimetallic means mounted on the shaft 12 or by any other known methods. Preferably, by using bimetallic means 16, the shaft 12 and therefore the valve 9 is automatically rotated between the first position of the valve shown in FIG. 2B and the second position of the valve shown in FIG. 2A, according to atmospheric temperature. Properly speaking, bimetallic means 16 should be arranged in the riser portion in the intake manifold because operation of valve 9 depends upon the temperature in the riser portion, but it may be possible, in practice, to provide bimetallic means 16 at such a position as shown in FIG. 1 because there is a certain relationship between the temperature in the riser portion and the atmospheric temperature adjacent to the position of the bimetallic means as shown in FIG. 1. A bearing bush for supporting the shaft 12 is indicated by the numeral 15 (FIG. 4) and the numeral 17 (FIG. 3) shows a boundary surface of the intake manifold 2 and the riser 5, said surface being sealed by, for example, a gasket.

The apparatus of the present invention operates as follows.

The exhaust gas burnt in the engine flows into the exhaust reactor 3. In normal operation, the exhaust gas is re-burnt and cleaned with secondary air fed from a secondary air injection nozzle (not shown) positioned at either the inlet of the reactor 3 or at an exhaust port (not shown), and then is discharged outside through the exhaust pipe 6. That is, as shown in FIG. 2B, the exhaust gas coming from a direction perpendicular to a plane in which the drawing lies is directly discharged into the exhaust pipe 6. As the control valve 9 closes the downstream end of the by-pass 7 by its head portion 14 as shown in FIG. 2B, the route of the reactor 3 → the heating chamber 4 → the by-pass 7 → the exhaust pipe 6 is not established.

During the engine-starting, i.e. before the engine warms up, the temperature in the intake manifold is relatively low and, as a result of this, the amount of noxious components contained in the exhaust gas before the engine warms up is more than after warm-up, as mentioned before. In order to solve this problem, the intake manifold 2, particularly the riser portion thereof, is heated by the exhaust gas, according to the present invention.

When the engine temperature is below a predetermined value, the control valve 9 occupies the position shown in FIG. 2A due to the action of the bimetallic means 16. That is, the passage directly connecting the reactor 3 to the exhaust pipe 6 is closed by the base portion 13 of the control valve 9 while the downstream end of the by-pass 7 is opened, as shown in FIG. 2A. As a result of this, the exhaust gas flows into the heating chamber 4 and then enters the by-pass 7 to be discharged into the exhaust pipe 6. Thus, the mixture in the intake manifold 2 is heated through the wall of the riser portion 5 by the relatively high temperature of the exhaust gas in the heating chamber 4. After the engine is warmed-up, the control valve 9 again occupies the position shown in FIG. 2B due to the action of the bimetallic means 16.

It should be easily understood that the previously mentioned object of the invention, i.e. the requirement of the reduction of the noxious components in the exhaust gas, can be completely satisfied by the above-mentioned process. In addition to this, it should be also understood that a compact construction of the reactor or a decrease of the amount of space previously required can be obtained by arranging the by-pass in the reactor adjacent to the inner passage thereof. Further, since the length of the re-circulating passage of the exhaust gas is considerably shortened in comparison with conventional apparatus of this kind, the exhaust gas can enter the heating chamber 4 keeping its high temperature and, thereby, there is no sacrifice of the so-called "emission efficiency" as in conventional apparatuses heretofore in use.

The operation of the control valve may also, of course, be performed by electric or mechanical means.

Obviously, many modifications and variations of the present invention are possible in the light of the above explanation. It should therefore be understood, that within the scope of the appended claims, the invention may be practised in other ways than those specifically described.

What I claim is:

1. In an internal combustion engine comprising an intake manifold having a riser portion, an exhaust gas reactor, and an exhaust pipe, the improvement comprising:
    a heating chamber for heating the intake manifold, said chamber being arranged directly and immediately below the riser portion of the intake manifold,
    a first passage connecting the interior of the reactor to the exhaust pipe,
    a straight vertical conduit fluidly communicating the interior of the reactor and said heating chamber, said one end of said conduit opening directly into said heating chamber in a direction toward said riser portion so that exhaust gas passing through said conduit can directly strike the riser portion the other end of said conduit opening directly into the reactor,
    a by-pass passage, for exhaust gas, in the reactor, the upstream end of said by-pass passage opening into said heating chamber and the downstream end of said by-pass passage opening into the first passage,
    a control valve, in said first passage adjacent the downstream end of the by-pass passage, for controlling the flow route of exhaust gas from the exhaust reactor, said control valve being pivotable in said first passage between a first position in which the downstream end of the by-pass passage is closed by the valve so that the exhaust gas from the reactor is discharged directly therefrom through said first passage into the exhaust pipe and a second position in which the first passage is closed by the valve so that the exhaust gas from the reactor is discharged therefrom through the heating chamber and the by-pass passage into the exhaust pipe.

2. In an internal combustion engine as claimed in claim 1, wherein:
    said reactor comprises a main inner passage, and said heating chamber and said by-pass passage are arranged as close as possible to the inner passage of the exhaust reactor.

3. In an internal combustion engine as claimed in claim 1, wherein:
   said control valve comprises a base portion to close the first passage and a head portion to close the downstream end of the by-pass passage, and said control valve is pivotally mounted in said first passage so as to occupy either said first position in which the downstream end of the by-pass passage is closed by the head portion or said second position in which the first passage is closed by the base portion.

4. In an internal combustion engine as claimed in claim 3, further comprising:
   a shaft in said first passage, said valve being pivotally mounted on said shaft.

5. In an internal combustion engine as claimed in claim 4, further comprising:
   means for moving said control valve into said first position when the temperature in the intake manifold is above a predetermined value and into said second position when the temperature in the intake manifold is below said predetermined value.

6. In an internal combustion engine as claimed in claim 5, wherein:
   said valve moving means comprises bimetallic means mounted to said shaft.

7. In an internal combustion engine as claimed in claim 1, wherein:
   said first passage and said by-pass passage are both vertical.

* * * * *